(12) United States Patent
Kaviani

(10) Patent No.: US 10,498,567 B1
(45) Date of Patent: Dec. 3, 2019

(54) DIE-TO-DIE COMMUNICATIONS SCHEME

(71) Applicant: Xilinx, Inc., San Jose, CA (US)

(72) Inventor: Alireza S. Kaviani, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/199,781

(22) Filed: Nov. 26, 2018

(51) Int. Cl.
*H03M 7/00* (2006.01)
*H04L 25/49* (2006.01)
*H04L 9/08* (2006.01)

(52) U.S. Cl.
CPC .......... *H04L 25/4917* (2013.01); *H04L 9/088* (2013.01)

(58) Field of Classification Search
CPC ...... H04L 25/4917; H04L 9/088; H03M 5/00; H03M 7/00
USPC ...................................................... 341/50, 51
See application file for complete search history.

(56) References Cited

U.S. PATENT DOCUMENTS

| | | | | |
|---|---|---|---|---|
| 8,520,400 B2* | 8/2013 | Rofougaran | ............ | H01L 23/66 307/3 |
| 8,576,928 B2* | 11/2013 | Allen | .................... | H04L 7/0008 375/257 |
| 8,600,442 B2* | 12/2013 | Rofougaran | ............ | H01L 23/66 235/380 |
| 8,792,835 B2* | 7/2014 | Andreu | ............ | G01R 31/31722 455/67.11 |
| 2009/0009337 A1* | 1/2009 | Rofougaran | ....... | G06K 7/10237 340/572.7 |
| 2013/0029598 A1* | 1/2013 | Rofougaran | ...... | H04L 12/40013 455/41.1 |

OTHER PUBLICATIONS

JEDEC, Multi-wire Multi-level I/O Standard, JEDEC Standard No. JESD247, Jun. 2016, pp. 1-26, JEDEC Solid State Technology Association, Arlington, Virginia, USA.
Erett, Marc et al., "A 126mW 56Gb/s NRZ Wireline Transceiver for Synchronous Short-Reach Applications in 16nm FinFET," Proc. of the 2018 IEEE International Solid-State Circuits Conference, Feb. 11, 2018, 3 pp., Session 16.7, IEEE, Piscataway, New Jersey, USA.
Shokrollahi, Amin et a;. "A Pin-Efficient 20.83Gb/s/wire 0.94pJ/bit Forwarded Clock CNRZ-5-Coded SerDes up to 12mm for MCM Packages in 28nm CMOS," Proc. of the 2016 IEEE International Solid-State Circuits Conference, Jan. 31, 2016, 3 pp., Session 10.1, IEEE, Piscataway, New Jersey, USA.

* cited by examiner

*Primary Examiner* — Jean B Jeanglaude
(74) *Attorney, Agent, or Firm* — Patterson + Sheridan, LLP

(57) ABSTRACT

Examples described herein provide a communication scheme between integrated circuit (IC) dies. In an example, an IC package includes a first IC die and a second IC die. The first IC die includes an encoder/decoder configured to implement encoded communications. The second IC die includes a transceiver configured to implement unencoded differential communications. The encoder/decoder is communicatively coupled to the transceiver. The encoder/decoder is configured to implement communications to the transceiver using a subset of a code map of the encoded communications.

20 Claims, 6 Drawing Sheets

| DATA STATES $(d_4, d_3, d_2, d_1, d_0)$ | ENCODED STATES $(W_5, W_4, W_3, W_2, W_1, W_0)$ | DATA STATES $(d_4, d_3, d_2, d_1, d_0)$ | ENCODED STATES $(W_5, W_4, W_3, W_2, W_1, W_0)$ |
|---|---|---|---|
| 00000 | (-1, -1/3, +1/3, +1, +1/3, -1/3) | 10000 | (-1/3, -1, +1/3, +1, +1/3, -1/3) |
| 00001 | (-1/3, +1/3, +1, +1/3, -1/3, -1) | 10001 | (+1/3, -1/3, +1, +1/3, -1/3, -1) |
| 00010 | (-1, -1/3, +1/3, -1/3, +1, +1/3) | 10010 | (-1/3, -1, +1/3, -1/3, +1, +1/3) |
| 00011 | (-1/3, +1/3, +1, -1, +1/3, -1/3) | 10011 | (+1/3, -1/3, +1, -1, +1/3, -1/3) |
| 00100 | (-1, -1/3, +1, +1/3, -1/3, +1/3) | 10100 | (-1/3, -1, +1, +1/3, -1/3, +1/3) |
| 00101 | (-1/3, +1/3, +1, -1/3, -1, +1/3) | 10101 | (+1/3, -1/3, +1, -1/3, -1, +1/3) |
| 00110 | (-1, -1/3, +1, -1/3, +1/3, +1) | 10110 | (-1/3, -1, +1, -1/3, +1/3, +1) |
| 00111 | (+1/3, -1, -1, -1/3, +1/3, +1/3) | 10111 | (+1/3, -1/3, -1, -1, -1/3, +1/3) |
| 01000 | (-1/3, +1/3, -1, +1, +1/3, -1/3) | 11000 | (+1/3, -1/3, -1, +1, +1/3, -1/3) |
| 01001 | (+1/3, +1, -1/3, +1/3, -1, +1/3) | 11001 | (+1, +1/3, -1/3, +1, +1/3, -1/3) |
| 01010 | (-1/3, +1, -1, -1/3, +1, +1/3) | 11010 | (+1, +1/3, -1/3, -1, +1/3, -1/3) |
| 01011 | (+1/3, +1, -1/3, -1, +1/3, -1/3) | 11011 | (+1, +1/3, -1, -1, -1/3, -1/3) |
| 01100 | (-1/3, +1, -1, +1/3, -1/3, +1/3) | 11100 | (+1, +1/3, -1, +1/3, -1/3, +1/3) |
| 01101 | (+1/3, +1, -1/3, +1/3, -1/3, -1) | 11101 | (+1, +1/3, -1/3, +1, -1/3, -1/3) |
| 01110 | (-1/3, +1, -1, -1/3, -1/3, +1) | 11110 | (+1, +1/3, -1, -1/3, +1/3, +1) |
| 01111 | (+1/3, +1, -1, -1/3, -1/3, +1/3) | 11111 | (+1, +1/3, -1, -1, -1/3, +1/3) |

FIG. 3

| DATA STATES $(d_4, d_3, d_2, d_1, d_0)$ | DATA STATES $(d_4, d_2, d_0)$ | ENCODED STATES $(W_5, W_4, W_3, W_2, W_1, W_0)$ |
|---|---|---|
| 01000 | 000 | (-1/3, +1/3, -1, +1, +1/3, -1/3) |
| 00011 | 001 | (-1/3, +1/3, +1, -1, +1/3, -1/3) |
| 01100 | 010 | (-1/3, +1/3, -1, +1, -1/3, +1/3) |
| 00111 | 011 | (-1/3, +1/3, +1, -1, -1/3, +1/3) |
| 11000 | 100 | (+1/3, -1/3, -1, +1, +1/3, -1/3) |
| 10011 | 101 | (+1/3, -1/3, +1, -1, +1/3, -1/3) |
| 11100 | 110 | (+1/3, -1/3, -1, +1, -1/3, +1/3) |
| 10111 | 111 | (+1/3, -1/3, +1, -1, -1/3, +1/3) |

FIG. 4

DIE-TO-DIE COMMUNICATIONS SCHEME

TECHNICAL FIELD

Examples of the present disclosure generally relate to communications between integrated circuit (IC) dies and, in particular, to a scheme for communication between an IC die implementing encoded communications and an IC die implementing unencoded communications.

BACKGROUND

In the semiconductor industry, a trend has emerged where separate integrated circuit (IC) dies implement different functionality and are packaged together to form a System-in-Package (SiP). This may permit simplified semiconductor processing for each IC die and may permit higher yield by de-coupling semiconductor processing for separate IC dies. Further, different suppliers may provide the different IC dies. For example, one supplier may provide a memory die, while another may provide a processor die. In such situations, communications between the IC dies can present challenges.

SUMMARY

Examples described herein provide a communication scheme between integrated circuit (IC) dies. More particularly, some examples provide for a communication scheme between an IC die that implements encoded communications and an IC die that implements unencoded communications. An IC die can therefore implement the encoded communications with a legacy IC die while obviating a time intensive and costly tape out to redesign the legacy IC die to also implement the encoded communications, among other things.

An example of the present disclosure is an IC package. The IC package includes a first IC die and a second IC die. The first IC die includes an encoder/decoder configured to implement encoded communications. The second IC die includes a transceiver configured to implement unencoded differential communications. The encoder/decoder is communicatively coupled to the transceiver. The encoder/decoder is configured to implement communications to the transceiver using a subset of a code map of the encoded communications.

Another example of the present disclosure is a method for communicating between IC dies. First data states are encoded, by an encoder/decoder of a first IC die, in a first communication according to a subset of a code map. The first communication is transmitted from the first IC die to a transceiver of a second IC die. The first data states are recovered, by the transceiver, from the first communication. The transceiver is configured to receive unencoded differential communications.

A further example of the present disclosure is an IC package. The IC package includes a field programmable gate array (FPGA) die and an IC die. The FPGA die includes a transceiver, and the transceiver includes differential receivers. The IC die includes an encoder/decoder configured to implement encoded differential communications. The encoder/decoder is communicatively coupled to the differential receivers. The encoder/decoder is configured to implement communications to the differential receivers using a subset of a code map of the encoded differential communications.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 is a code map for implementing the Joint Electron Device Engineering Counsel (JEDEC) JESD247 standard.

FIG. 4 is a subset of the code map of FIG. 3 that can be implemented by the first IC die of FIG. 2 according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
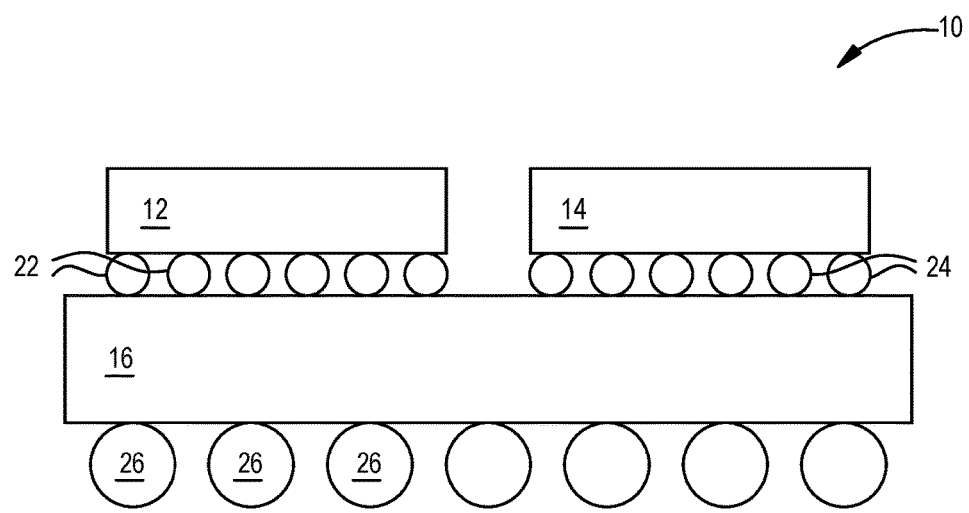
FIG. 1 is a simplified schematic of a multi-die apparatus according to some examples.

Examples described herein provide a communication scheme between integrated circuit (IC) dies. More particularly, some examples provide for a communication scheme between an IC die that implements encoded communications and an IC die that implements unencoded communications. In some examples, the IC die that implements encoded communications encodes communications using a subset of a code map of the encoded communications. Such communications may be received by the IC die that implements unencoded communications, and data encoded in the communications can be recovered by the receiving IC die.

To facilitate communications between IC dies, such as IC dies in a package, standards have been promulgated to standardize the interface between the IC dies and to standardize the encoding scheme. One such standard is the Joint Electron Device Engineering Counsel (JEDEC) JESD247 standard. The JESD247 standard is an Ultra-Short Reach (USR) JEDEC standard that implements a multi-wire, multi-level input/output specification along with encoding to achieve low power, high bandwidth Multi-Chip Module (MCM) serial connectivity in a package. A challenge with standards is that standards can be revised or new standards can be generated.

Some examples described herein can provide support for interfacing an IC die implementing an interface for encoded communications (e.g., according to the JESD247 standard) to a legacy solution or another USR standard that does not implement such encoding. Examples of such short reach communication standards without encoding include OIF CEI-56G-USR-NRZ or CEI-56G-XSR-NRZ. An IC die can therefore implement communications with a legacy IC die while obviating a time intensive and costly tape out to redesign the legacy IC die to also implement the encoded communications. Other advantages can also be achieved.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Even further, various logic states are described as examples below.

FIG. 1 is a simplified schematic of a multi-die apparatus 10 according to some examples. The multi-die apparatus 10 includes a first IC die 12, a second IC die 14, and a substrate 16. The first IC die 12 is mechanically attached and electrically coupled to the substrate 16 by external connectors 22, and the second IC die 14 is mechanically attached and electrically coupled to the substrate 16 by external connectors 24. The substrate 16 can be an interposer, a package substrate, or other substrate. The external connectors 22 and 24 can be or include minibumps, microbumps, controlled collapse chip connection (C4), or other connectors. External connectors 26 are on a side of the substrate 16 opposite from the side of the substrate 16 to which the first IC die 12 and the second IC die 14 are attached. The external connectors 26 can be or include ball grid array (BGA) balls, for example.

The first IC die 12 and the second IC die 14 are communicatively coupled together via the substrate 16 in the illustrated example of FIG. 1. For example, the ICs of the first IC die 12 and second IC die 14 are electrically connected via the external connectors 22 and 24 and metal lines and/or vias of the substrate 16. Other examples contemplate other configurations of multiple IC dies that are communicatively coupled together. For example, a first IC die can be stacked on a second IC die (or vice versa), directly or through one or more intervening IC dies.

Figure 2:
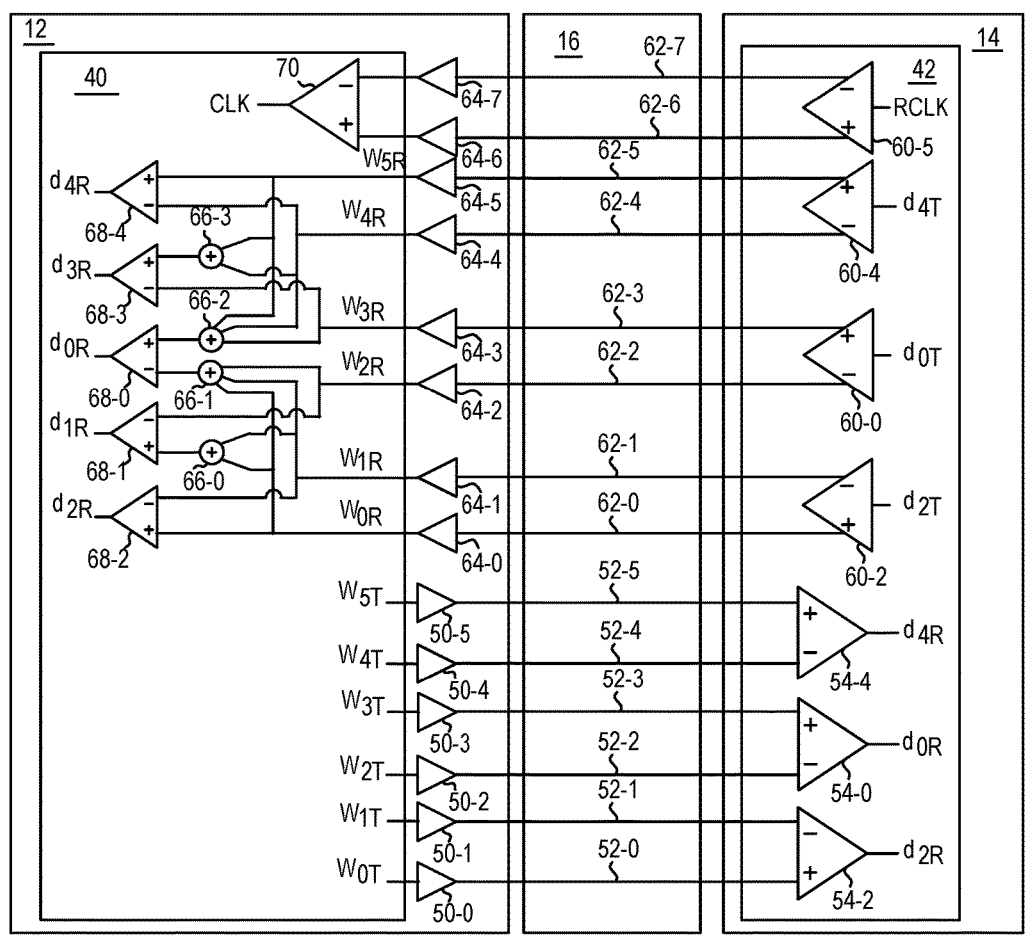
FIG. 2 is a communication architecture between a first IC die and a second IC die according to some examples.

FIG. 2 illustrates a communication architecture between the first IC die 12 and the second IC die 14, via the substrate 16, according to some examples. In this example, the first IC die 12 is configured to implement encoded communications, and the second IC die 14 is configured to implement unencoded, regular differential communications.

The first IC die 12 includes an encoder/decoder 40, which includes logic, a look-up table (LUT), and/or other circuitry implemented to encode data to be transmitted and to decode signals that are received. The encoder/decoder 40 has encoded state output nodes $w_{0T}$, $w_{1T}$, $w_{2T}$, $w_{3T}$, $w_{4T}$, and $w_{5T}$ that are connected input nodes of drivers 50-0 through 50-5, respectively. Output nodes of drivers 50-0 through 50-5 are electrically connected to input nodes of differential receivers 54-0, 54-2, and 54-4 of the second IC die 14 via connections 52-0 through 52-5. More specifically, the output node of driver 50-0 is electrically connected to a positive input node of differential receiver 54-2 via connection 52-0. The output node of driver 50-1 is electrically connected to a negative input node of the differential receiver 54-2 via connection 52-1. The output node of driver 50-2 is electrically connected to a negative input node of differential receiver 54-0 via connection 52-2. The output node of driver 50-3 is electrically connected to a positive input node of the differential receiver 54-0 via connection 52-3. The output node of driver 50-4 is electrically connected to a negative input node of differential receiver 54-4 via connection 52-4. The output node of driver 50-5 is electrically connected to a positive input node of the differential receiver 54-4 via connection 52-5. The drivers 50-0 through 50-5 can each be a multi-state driver. In the description herein, the drivers 50-0 through 50-5 are each quaternary state drivers that are capable of outputting a signal at one of four signal levels (e.g., logically, +1, +⅓, −⅓, and −1). Other examples can implement different numbers of states, for example, based on the encoding scheme that may be implemented.

The connections 52-0 through 52-5 can be or include interconnections in metallization of the first IC die 12, external connectors 22, interconnections in the substrate 16, external connectors 24, and/or interconnections in metallization of the second IC die 14. The differential receivers 54-0, 54-2, and 54-4 have data state output nodes $d_{0R}$, $d_{2R}$, and $d_{4R}$, respectively, which may be or include interconnections in metallization of the second IC die 14. The differential receivers 54-0, 54-2, and 54-4 are in a transceiver 42 in the second IC die 14.

The transceiver 42 in the second IC die 14 further includes differential transmitters 60-0, 60-2, 60-4, and 60-5. The differential transmitters 60-0, 60-2, and 60-4 have data state input nodes $d_{0T}$, $d_{2T}$, and $d_{4T}$, respectively. The differential transmitter 60-5 has a replicated clock input node RCLK. Differential output nodes of differential transmitters 60-0, 60-2, 60-4, and 60-5 are electrically connected to input nodes of drivers 64-0 through 64-7 of the first IC die 12 via connections 62-0 through 62-7. More specifically, the positive output node of differential transmitter 60-2 is electrically connected to the input node of driver 64-0 via connection 62-0. The negative output node of differential transmitter 60-2 is electrically connected to the input node of driver 64-1 via connection 62-1. The negative output node of differential transmitter 60-0 is electrically connected to the input node of driver 64-2 via connection 62-2. The positive output node of differential transmitter 60-0 is electrically connected to the input node of driver 64-3 via connection 62-3. The negative output node of differential transmitter 60-4 is electrically connected to the input node of driver 64-4 via connection 62-4. The positive output node of differential transmitter 60-4 is electrically connected to the input node of driver 64-5 via connection 62-5. The positive output node of differential transmitter 60-5 is electrically connected to the input node of driver 64-6 via connection 62-6. The negative output node of differential transmitter 60-5 is electrically connected to the input node of driver 64-7 via connection 62-7.

The connections 62-0 through 62-7 can be or include interconnections in metallization of the first IC die 12, external connectors 22, interconnections in the substrate 16, external connectors 24, and/or interconnections in metallization of the second IC die 14.

The drivers 64-0 through 64-5 have output nodes electrically connected to encoded state input nodes $w_{0R}$, $w_{1R}$, $w_{2R}$, $w_{3R}$, $w_{4R}$, and $w_{5R}$, respectively, which may be or include interconnections in metallization of the first IC die 12. The encoded state input nodes $w_{0R}$, $w_{1R}$, $w_{2R}$, $w_{3R}$, $w_{4R}$, and $w_{5R}$ are input nodes of the encoder/decoder 40 of the first IC die 12. The encoded state input node $w_{0R}$ is connected to a positive input node of a differential receiver 68-2, an input node of the adder 66-0, and an input node of the adder 66-1. The encoded state input node $w_{1R}$ is connected to a negative input node of the differential receiver 68-2, an input node of the adder 66-0, and an input node of the adder 66-1. An output node of the adder 66-0 is connected to a positive input node of a differential receiver 68-1. The encoded state input node $w_{2R}$ is connected to a negative input node of the differential receiver 68-1 and an input node of the adder 66-1. An output node of the adder 66-1 is connected to a negative input node of a differential receiver 68-0. The encoded state input node $w_{3R}$ is connected to a negative input node of a differential receiver 68-3 and an input node of an adder 66-2. The encoded state input node $w_{4R}$ is connected to a negative input node of a differential receiver 68-4, an input node of an adder 66-3, and an input node of the adder 66-2. The encoded state input node $w_{5R}$ is connected to a positive input node of the differential receiver 68-4, an input node of the adder 66-3, and an input node of the adder 66-2. An output node of the adder 66-2 is connected to a positive input node of the differential receiver 68-0. An output node of the adder 66-3 is connected to a positive input node of the differential receiver 68-3. Respective output nodes of the differential receivers 68-0 through 68-4 are connected to data state output nodes $d_{0R}$, $d_{1R}$, $d_{2R}$, $d_{3R}$, and $d_{4R}$.

The encoder/decoder 40 further includes a differential receiver 70. An output node of the driver 64-6 is electrically connected to a positive input node of the differential receiver 70, and an output node of the driver 64-7 is electrically connected to a negative input node of the differential receiver 70. An output node of the differential receiver 70 is electrically connected to a clock node CLK.

Generally, and as will become apparent, the encoder/decoder 40 is configured to implement encoded communications between the first IC die 12 and the second IC die 14. The encoder/decoder 40 is further configured to implement a subset of a code map for communications such that the receiving circuit can be implemented by differential receivers. An example is described in the context of the JESD247 standard, although other examples contemplate different encoding, which may be proprietary or standard-based.

According to the JESD247 standard, signals on the encoded state input and output nodes $w_{0R}$, $w_{0T}$, $w_{1R}$, $w_{1T}$, $w_{2R}$, $w_{2T}$, $w_{3R}$, $w_{3T}$, $w_{4R}$, $w_{4T}$, $w_{5R}$, and $w_{5T}$ can be any of quaternary signal levels (e.g., logically, +1, +⅓, −⅓, and −1). Signals on the data state input and output nodes $d_{0R}$, $d_{0T}$, $d_{1R}$, $d_{2R}$, $d_{2T}$, $d_{3R}$, $d_{4R}$, and $d_{4T}$ can be binary signal levels (e.g., logically 0 and 1). FIG. 3 is a code map for implementing the JESD247 standard. The code map lists data states $d_0$, $d_1$, $d_2$, $d_3$, and $d_4$ and the corresponding encoded states $w_0$, $w_1$, $w_2$, $w_3$, $w_4$, and $w_5$. The encoded states $w_0$, $w_1$, $w_2$, $w_3$, $w_4$, and $w_5$ can be on respective encoded state input and output nodes $w_{0R}$, $w_{0T}$, $w_{1R}$, $w_{1T}$, $w_{2R}$, $w_{2T}$, $w_{3R}$, $w_{3T}$, $w_{4R}$, $w_{4T}$, $w_{5R}$, and $w_{5T}$ (based on corresponding subscript indications). The data states $d_0$, $d_1$, $d_2$, $d_3$, and $d_4$ can be on the data state input and output nodes $d_{0R}$, $d_{0T}$, $d_{1R}$, $d_{2R}$, $d_{2T}$, $d_{3R}$, $d_{4R}$, and $d_{4T}$ (based on corresponding subscript indications). A person having ordinary skill in the art will readily understand the operation of the encoder/decoder 40 of FIG. 2, particularly in view of the code map of FIG. 3.

FIG. 4 illustrates a subset of the code map of FIG. 3 that can be implemented by the encoder/decoder 40 of the first IC die 12 according to some examples. According to the JESD247 standard, a receiver is implemented like in the encoder/decoder 40 of the first IC die 12 (e.g., including differential receivers 68-0 through 68-4 and adders 66-0 through 66-3). The receiver implemented in the encoder/decoder 40 of the first IC die 12 is discussed below to provide context of how data states can be recovered. This context is provided to illustrate how the encoder/decoder 40 of the first IC die 12 can generate communications that are transmitted to the second IC die 14, where the second IC die 14 can recover the data states.

As seen from the implementation of the receiver in the encoder/decoder 40, the data state $d_2$ on the data state output node $d_{2R}$ can result from a differential signal input into the differential receiver 68-2, which signal corresponds to encoded states $w_0$ and $w_1$ on encoded state input nodes $w_{0R}$ and $w_{1R}$, respectively. Similarly, the data state $d_4$ on the data state output node $d_{4R}$ can result from a differential signal input into the differential receiver 68-4, which signal corresponds to encoded states $w_4$ and $w_5$ on encoded state input nodes $w_{4R}$ and $w_{5R}$, respectively. Accordingly, data states $d_2$ and $d_4$ can be recovered from encoded states $w_0$, $w_1$, $w_4$, and $w_5$ on the encoded state output nodes $w_{0T}$, $w_{1T}$, $w_{4T}$, and $w_{5T}$, respectively, transmitted from the first IC die 12 and received at the second IC die 14 using differential receivers 54-2 and 54-4 in the transceiver 42 of the second IC die 14 as illustrated in FIG. 2.

As further seen from the implementation of the receiver in the encoder/decoder 40, the data state do on the data state output node $d_{0R}$ can result from a differential signal input into the differential receiver 68-0, which signal corresponds to a sum of encoded states $w_0$, $w_1$, and $w_2$ on encoded state input nodes $w_{0R}$, $w_{1R}$, and $w_{2R}$ and a sum of encoded states $w_3$, $w_4$, and $w_5$ on encoded state input nodes $w_{3R}$, $w_{4R}$, and $w_{5R}$ (e.g., $d_0=(w_3+w_4+w_5)-(w_0+w_1+w_2)$). If the encoded states $w_0$ and $w_1$ cancel each other out (e.g., $w_0=-w_1$) and the encoded states $w_4$ and $w_5$ cancel each other out (e.g., $w_4=-w_5$), then the data state do on the data state output node $d_{0R}$ can result from a differential signal input into the differential receiver 68-0, which signal corresponds to encoded states $w_2$ and $w_3$ on encoded state input nodes $w_{2R}$ and $w_{3R}$, respectively. Accordingly, under such circumstances, data state do can be recovered from encoded states $w_2$ and $w_3$ on the encoded state output nodes $w_{2T}$ and $w_{3T}$, respectively, transmitted from the first IC die 12 and received at the second IC die 14 using the differential receiver 54-0 in the transceiver 42 of the second IC die 14 as illustrated in FIG. 2.

FIG. 4 lists the restricted subset of the code map of FIG. 3 in which the combinations of encoded states $w_0$ and $w_1$ and combinations of encoded states $w_4$ and $w_5$ that achieve data states $d_2$ and $d_4$, respectively, are restricted to permit the recovery of data state do as a difference between the encoded state $w_3$ and the encoded state $w_2$. In the illustrated example, the encoded states $w_5$ and $w_4$ are −⅓ and +⅓, respectively, to obtain a data state $d_4$ of 0, and the encoded states $w_5$ and $w_4$ are +⅓ and −⅓, respectively, to obtain a data state $d_4$ of 1. Similarly, the encoded states $w_1$ and $w_0$ are +⅓ and −⅓, respectively, to obtain a data state $d_2$ of 0, and the encoded states $w_1$ and $w_0$ are −⅓ and +⅓, respectively, to obtain a data state $d_2$ of 1. These states permit the data state do to be determined as a differential of encoded states $w_3$ and $w_2$, where the encoded states $w_3$ and $w_2$ are −1 and +1, respectively, to obtain a data state do of 0, and the encoded states $w_3$ and $w_2$ are +1 and −1, respectively, to obtain a data state do of 1. Accordingly, using the restricted subset in FIG. 4, the encoder/decoder 40 of the first IC die 12 can encode and transmit communications to the second IC die 14, which can recover the data states that were encoded by the encoder/decoder 40 of the first IC die 12.

The encoder/decoder 40 can also recover data states of communications transmitted from the second IC die 14. The differential transmitters 60-0, 60-2, and 60-4 generate signals having binary signal levels (e.g., −1/+1). The data state $d_2$ on the data state output node $d_{2R}$ can result from the differential signal input into the differential receiver 68-2, which signal corresponds to signals on encoded state input nodes $w_{0R}$ and $w_{1R}$, respectively, which signals were output by the differential transmitter 60-2. The data state $d_4$ on the data state output node $d_{4R}$ can result from the differential signal input into the differential receiver 68-4, which signal corresponds to signals on encoded state input nodes $w_{4R}$ and $w_{5R}$, respectively, which signals were output by the differential transmitter 60-4. With the differential transmitters 60-2 and 60-4 generating binary signal levels, the signals on encoded state input nodes $w_{0R}$ and $w_{1R}$ cancel each other out (e.g., $w_0=-w_1$), and the signals on encoded state input nodes $w_{4R}$ and $w_{5R}$ cancel each other out (e.g., $w_4=-w_5$). Accordingly, the data state do on the data state output node $d_{0R}$ can result from the differential signal input into the differential receiver 68-0, which signal corresponds to signals on encoded state input nodes $w_{2R}$ and $w_{3R}$, respectively, which signals were output by the differential transmitter 60-0. Accordingly, data states $d_0$, $d_2$, and $d_4$ can be recovered from signals on the encoded state input nodes $w_{0R}$, $w_{1R}$, $w_{2R}$, $w_{3R}$, $w_{4R}$, and $w_{5R}$ transmitted from the second IC die 14 and received at the first IC die 12 using the encoder/decoder 40 of the first IC die 12 as illustrated in FIG. 2.

As illustrated, an IC die that implements encoded communications can communicate to an IC die that implements regular differential, unencoded communications (e.g., non-standards based or standard based, such as CEI-56G-USR-NRZ). In FIG. 2, the encoder/decoder 40 encodes communications that are output by the drivers 50-0 through 50-5 to the connections 52-0 through 52-5. The encoded communications are received at the differential receivers 54-0, 54-2, and 54-4 that output respective signals based on regular differential signaling rather than decoding the encoded communications. Further, regular differential signals that are output by the differential transmitters 60-0, 60-2, and 60-4 to the connections 62-0 through 62-5 are received by the encoder/decoder 40 that outputs data states.

Accordingly, for example, an IC die that implements encoded communications can be compatible with an IC die that does not implement such encoded communications. An instantaneous throughput of communications in such examples may be less than an instantaneous throughput of communications achieved between IC dies that implement the encoded communications. For example, in the context of the JESD247 standard described above, the scheme of FIG. 2 can have three-fifths (⅗) of the throughput that two IC dies implementing the JESD247 standard can achieve.

In some examples, a configuration is input to the encoder/decoder 40 of the first IC die 12 so that the encoder/decoder 40 responsively encodes signals using an entirety of a code map or a restricted subset of the code map. In this way, the first IC die 12 may be used in a multi-die apparatus where another IC die with which the first IC die 12 communicates can implement regular differential, unencoded communications. A data layer of the encoder/decoder 40 can use the entirety of the code map or can use the restricted subset of the code map based on the configuration input to the encoder/decoder 40.

Figure 5:
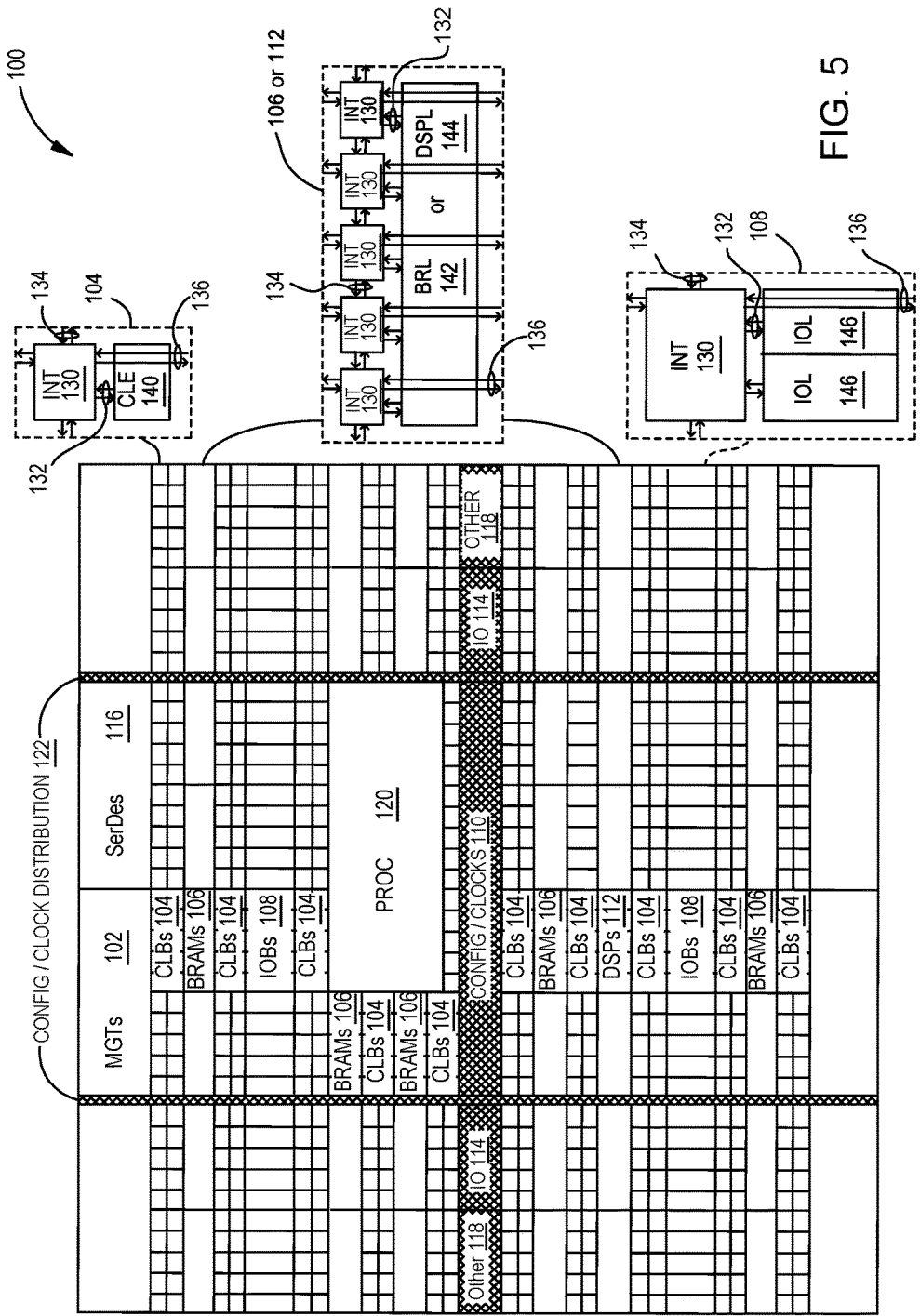
FIG. 5 is an architecture of a field programmable gate array (FPGA) according to some examples.

According to some examples, the second IC die 14 described above can be implemented with an integrated circuit, such as a field programmable gate array (FPGA) or like type programmable circuit. FIG. 5 illustrates an architecture of FPGA 100 that includes a large number of different programmable tiles including multi-gigabit transceivers (MGTs) 102, configurable logic blocks (CLBs) 104, random access memory blocks (BRAMs) 106, input/output blocks (IOBs) 108, configuration and clocking logic (CONFIG/CLOCKS) 110, digital signal processing blocks (DSPs) 112, specialized input/output blocks (I/O) 114 (e.g., configuration ports and clock ports), serializer-deserializer logic (SerDes) 116, and other programmable logic 118 such as digital clock managers, analog-to-digital converters, system monitoring logic, and so forth. Some FPGAs also include dedicated processor blocks (PROC) 120.

In the pictured example, a horizontal area near the center of the IC die is used for configuration, clock, and other control logic. Vertical columns 122 extending from this horizontal area or column are used to distribute the clocks and configuration signals across the breadth of the FPGA.

In some FPGAs, each programmable tile can include at least one programmable interconnect element (INT) 130 having connections to input and output terminals 132 of a programmable logic element within the same tile, as shown by examples included in FIG. 5. Each programmable interconnect element 130 can also include connections to interconnect segments 134 of adjacent programmable interconnect element(s) in the same tile or other tile(s). Each programmable interconnect element 130 can also include connections to interconnect segments 136 of general routing resources between logic blocks (not shown). The general routing resources can include routing channels between logic blocks (not shown) comprising tracks of interconnect segments (e.g., interconnect segments 136) and switch blocks (not shown) for connecting interconnect segments. The interconnect segments of the general routing resources (e.g., interconnect segments 136) can span one or more logic blocks. The programmable interconnect elements 130 taken together with the general routing resources implement a programmable interconnect structure (programmable interconnect) for the illustrated FPGA.

In an example implementation, a CLB 104 can include a configurable logic element (CLE) 140 that can be programmed to implement user logic plus a single programmable interconnect element (INT) 130. A BRAM 106 can include a BRAM logic element (BRL) 142 in addition to one or more programmable interconnect elements 130. Typically, the number of programmable interconnect elements 130 included in a tile depends on the height of the tile. In the illustrated example, a BRAM tile has the same height as five CLBs, but other numbers (e.g., four) can also be used. A DSP 112 can include a DSP logic element (DSPL) 144 in addition to an appropriate number of programmable interconnect elements 130. An IOB 108 can include, for example, two instances of an input/output logic element (IOL) 146 in addition to one instance of the programmable interconnect element 130. As will be clear to those of skill in the art, the actual I/O pads connected, for example, to the input/output logic element 146 typically are not confined to the area of the input/output logic element 146.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, processor block 120 spans several columns of CLBs 104 and BRAMs 106. The processor block 120 can include various components ranging from a single microprocessor to a complete programmable processing system of microprocessor(s), memory controllers, peripherals, and the like.

Note that FIG. 5 is intended to illustrate only an example FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In some examples, the second IC die 14 implements an FPGA 100, such as the Virtex® UltraScale+™ device or the Kintex® UltraSCALE+™ device as available from Xilinx, Inc. These example FPGA devices provide for quad gigabit transceivers (e.g., the MGTs 102 in FIG. 5). The transceiver 42 of the second IC die 14, as generally illustrated, can be a quad gigabit transceiver in these example FPGA devices. The quad gigabit transceiver ("Xilinx Quad GT") includes four differential receivers (corresponding to four receive channels) and four differential transmitters (corresponding to four transmit channels). As apparent from FIG. 2, one of the differential receivers may be unused in some examples. Further description with respect to these example devices is to illustrate various aspects that may be implemented in some examples, and other examples may be implemented using other devices.

As described previously, in some examples, a subset of a code map is implemented for communications between IC dies. Implementing the subset of the code map, as opposed to the full code map, can reduce throughput of communications. In some examples, throughput can be at least partially recovered by increasing the frequency of the communications between the IC dies. For example, the frequency of communications can be increased above a predefined frequency of the encoded standard. The Xilinx Quad GT, in some examples, is rated at 32 GHz, whereas implementations of the JESD247 standard can be rated at a line rate of 21 GHz. By increasing the frequency of the communications to, e.g., 32 GHz from 21 GHz, a lost throughput of communication due to this method can be recovered.

The Xilinx Quad GT includes clock data recovery (CDR). This permits communications received by the Xilinx Quad GT to obviate receiving a source clock signal on a channel of the Xilinx Quad GT. In some examples, the encoder/decoder 40 of the first IC die 12 may implement source synchronous communications that use a source clock signal, such as in the JESD247 standard. In such examples, the encoder/decoder 40 receives a clock signal from the transmission source to implement the source synchronous communications. In the Xilinx Quad GT, a differential transmitter can be implemented to transmit a replicated clock signal to the encoder/decoder 40. As generally illustrated in FIG. 2, the differential transmitter 60-5 transmits a differential replicated clock signal to the differential receiver 70 via connections 62-6 and 62-7 and drivers 64-6 and 64-7, and the differential receiver 70 outputs the replicated clock signal on the clock node CLK in the encoder/decoder 40 to enable receiving communications from the second IC die 14 in the source synchronous scheme. A fixed pattern of "1"s and "0"s can be input into the differential transmitter 60-5 on the replicated clock input node RCLK to generate a replicated clock signal. For example, four "1"s followed by four "0"s, which can form a cycle of a replicated clock signal, can be input into the differential transmitter 60-5. In some examples, the replicated clock signal transmitted over the connections 62-6 and 62-7 has a frequency at one-fourth (¼) to one-eighth (⅛) of the frequency rating of the connections 62-6 and 62-7, such as when JESD247 is implemented in the encoder/decoder 40. Accordingly, the fixed pattern of "1"s and "0"s can implement a replicated clock signal with such a frequency. In examples implementing the Xilinx Quad GT, three receive channels can be implemented to receive data; three transmit channels can be implemented to transmit data; and one transmit channel can be implemented to transmit a replicated clock signal.

In other examples (such as the ones in other USR standards similar to CEI-56G-USR-NRZ), a clock signal can be provided by the transceiver 42 for source synchronous communications with the first IC die 12. Such an implementation can obviate using a differential transmitter to replicate a clock signal, can improve performance, and can reduce power. Further, the transceiver 42 can implement source synchronous communications, which can reduce power and increase throughput.

In some examples, communications between IC dies may be implemented using signals having a predefined peak-to-peak voltage range. The Xilinx Quad GT are programmable, which can permit programming the peak-to-peak voltage range for signals transmitted by transmitters and to be received by receivers in the Xilinx Quad GT. For example, in the JESD247 standard, the peak-to-peak voltage is 254 mV, and the Xilinx Quad GT can be programmed to implement a peak-to-peak voltage of 254 mV.

Power consumption differences between IC dies may also be a discrepancy. In some examples, a power dissipation rating of the first IC die 12 is less than a power dissipation rating of the second IC die 14. For example, implementations of the JESD247 standard can be rated with a power dissipation of 0.8 to 1 pJ/bit, and the Xilinx Quad GT can be rated at five to ten times more than the implementations of the JESD247 standard. Power dissipation of the Xilinx Quad GT can be reduced and/or mitigated by implementing the IC dies in closer proximity (e.g., shorter connections between the IC dies) in the multi-die apparatus 10 and/or by using a low power mode of the Xilinx Quad GT.

Examples above can be useful for prototyping using FPGAs along with a companion chiplet that uses the JESD247 standard. Examples can also be useful for legacy support for any provider that adopts the JESD247 standard. The legacy solutions can be regular differential at lower line rates. JESD247 adopters may therefore have a form of legacy support. Other examples of use case include enabling communication between various emerging USR standards.

Figure 6:
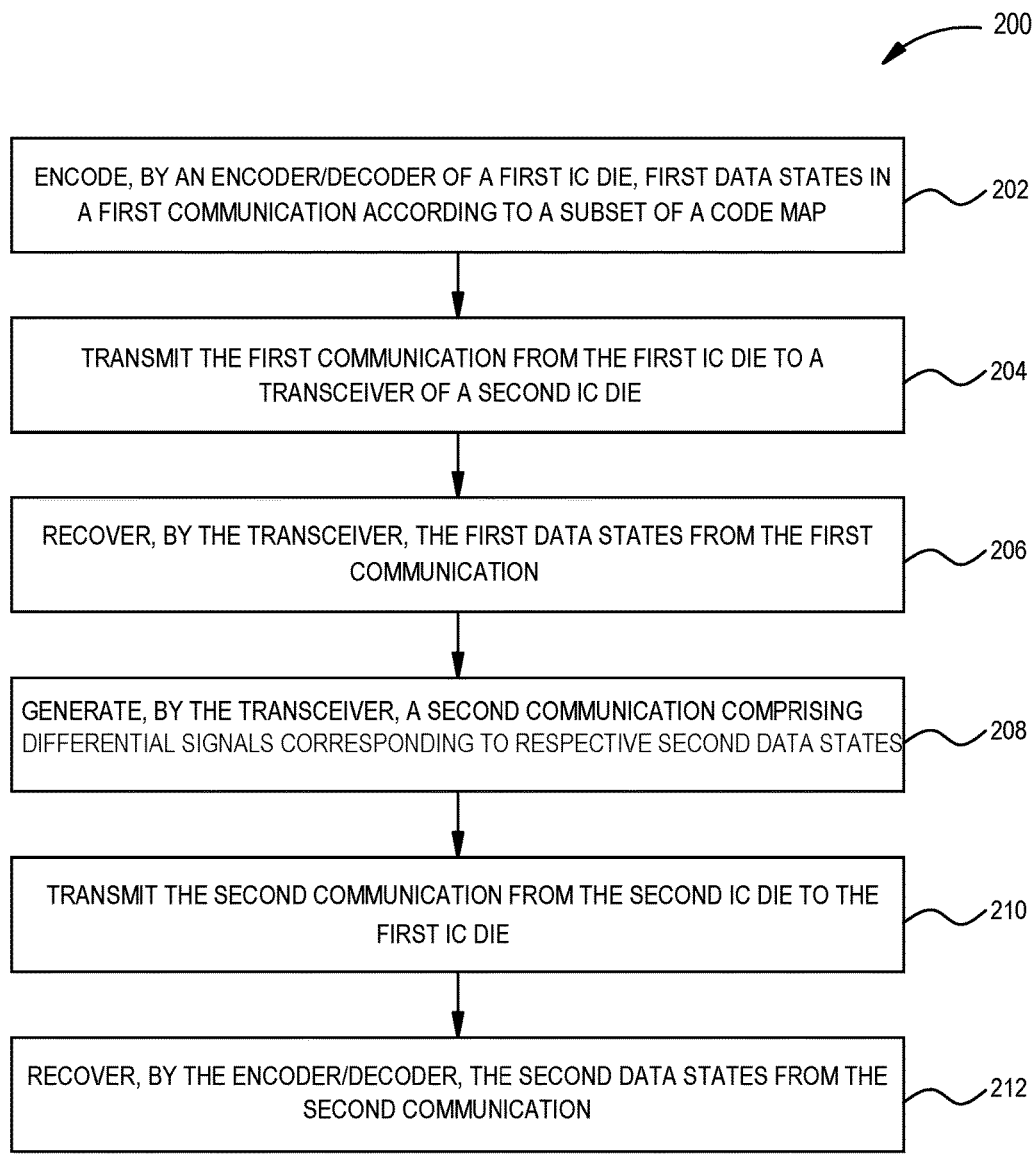
FIG. 6 is a flowchart of a method for communicating between IC dies according to some examples.

FIG. 6 is a flowchart of a method 200 for communicating between IC dies according to some examples. In operation 202, an encoder/decoder 40 of a first IC die 12 encodes first data states $d_0$, $d_2$, $d_4$ in a first communication (e.g., as encoded states $w_0$, $w_1$, $w_2$, $w_3$, $w_4$, $w_5$) according to a subset of a code map, such as shown in FIG. 4. In operation 204, the first communication is transmitted from the first IC die 12 to a transceiver 42 of a second IC die 14. In operation 206, the transceiver 42 recovers the first data states $d_0$, $d_2$, $d_4$ from the first communication. In operation 208, the transceiver 42 generates a second communication comprising differential signals corresponding to second data states $d_0$, $d_2$, $d_4$. In operation 210, the second communication is transmitted from the second IC die 14 to the first IC die 12. In operation 212, the encoder/decoder 40 recovers the second data states $d_0$, $d_2$, $d_4$ from the second communication. The various operations can be performed in any logical order. Details of the operations 202 through 212 are described above, and are therefore omitted here.

While the foregoing is directed to specific examples, other and further examples may be devised without departing from the basic scope thereof, and the scope thereof is determined by the claims that follow.

What is claimed is:

1. An integrated circuit (IC) package comprising:
a first IC die comprising an encoder/decoder configured to implement encoded communications; and
a second IC die comprising a transceiver configured to implement unencoded differential communications, the encoder/decoder being communicatively coupled to the transceiver, the encoder/decoder being configured to implement communications to the transceiver using a subset of a code map of the encoded communications.

2. The IC package of claim 1, wherein the transceiver is configured to implement communications to the encoder/decoder using the unencoded differential communications.

3. The IC package of claim 1, wherein the encoded communications are encoded differential communications.

4. The IC package of claim 1, wherein the code map includes data states corresponding to encoded states, the subset of the code map being restricted to data states each having pairs of the encoded states, wherein for each of the pairs of the encoded states, the encoded states of the respective pair have an equal magnitude.

5. The IC package of claim 1, wherein the code map is a code map of the Joint Electron Device Engineering Counsel (JEDEC) JESD247 standard.

6. The IC package of claim 1, wherein:
the encoder/decoder is configured to implement source synchronous communications; and
the transceiver includes a transmitter configured to transmit a replicated clock signal to the encoder/decoder.

7. The IC package of claim 1, wherein the transceiver has a programmable peak-to-peak voltage range.

8. The IC package of claim 1 further comprising a substrate, the first IC die and the second IC die being attached to the substrate, the encoder/decoder being communicatively coupled to the transceiver via the substrate.

9. A method for communicating between integrated circuit (IC) dies, the method comprising:
encoding, by an encoder/decoder of a first IC die, first data states in a first communication according to a subset of a code map;
transmitting the first communication from the first IC die to a transceiver of a second IC die; and
recovering, by the transceiver, the first data states from the first communication, the transceiver being configured to receive unencoded differential communications.

10. The method of claim 9 further comprising:
generating, by the transceiver, a second communication comprising differential signals corresponding to respective second data states;
transmitting the second communication from the second IC die to the first IC die; and
recovering, by the encoder/decoder, the second data states from the second communication.

11. The method of claim 10 further comprising:
generating, by the transceiver, a replicated clock signal; and
transmitting the replicated clock signal from the second IC die to the first IC die.

12. The method of claim 9, wherein the first communication is an encoded differential communication.

13. The method of claim 9, wherein the code map includes data states corresponding to encoded states, the subset of the code map being restricted to data states each having pairs of the encoded states, wherein for each of the pairs of the encoded states, the encoded states of the respective pair have an equal magnitude.

14. The method of claim 9, wherein the code map is a code map of the Joint Electron Device Engineering Counsel (JEDEC) JESD247 standard.

15. The method of claim 9, wherein the transceiver has a programmable peak-to-peak voltage range.

16. An integrated circuit (IC) package comprising:
a field programmable gate array (FPGA) die comprising a transceiver, the transceiver comprising differential receivers; and
an IC die comprising an encoder/decoder configured to implement encoded differential communications, the encoder/decoder being communicatively coupled to the differential receivers, the encoder/decoder being configured to implement communications to the differential receivers using a subset of a code map of the encoded differential communications.

17. The IC package of claim 16, wherein the transceiver further comprises differential transmitters, the differential transmitters being communicatively coupled to the encoder/decoder, the transceiver being configured to implement communications to the encoder/decoder using unencoded differential communications.

18. The IC package of claim 17, wherein at least one of the differential transmitters is configured to generate a replicated clock signal, the at least one of the differential transmitters being communicatively coupled to the encoder/decoder.

19. The IC package of claim 16, wherein the code map is a code map of the Joint Electron Device Engineering Counsel (JEDEC) JESD247 standard.

20. The IC package of claim 16, wherein the transceiver is programmable to configure a peak-to-peak voltage range of the transceiver.

* * * * *